US012340767B1

(12) United States Patent
Orio et al.

(10) Patent No.: US 12,340,767 B1
(45) Date of Patent: Jun. 24, 2025

(54) LOCAL DIMMING FOR DISPLAY DEVICES WITH IMAGE WARPING FUNCTION

(71) Applicant: Synaptics Incorporated, San Jose, CA (US)

(72) Inventors: Masao Orio, Tokyo (JP); Takashi Nose, Kanagawa (JP); Hirobumi Furihata, Tokyo (JP); Tomoo Minaki, Tokyo (JP); Kazutoshi Aogaki, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/678,313

(22) Filed: May 30, 2024

(51) Int. Cl.
*G09G 3/34* (2006.01)
*G09G 3/00* (2006.01)

(52) U.S. Cl.
CPC .......... *G09G 3/3406* (2013.01); *G09G 3/001* (2013.01); *G09G 3/03* (2020.08); *G09G 2300/0452* (2013.01); *G09G 2320/0626* (2013.01); *G09G 2340/0407* (2013.01)

(58) Field of Classification Search
CPC ........ G09G 3/3406; G09G 3/03; G09G 3/001; G09G 2300/0452; G09G 2320/0626; G09G 2340/0407; G09G 3/00
See application file for complete search history.

(56) References Cited

U.S. PATENT DOCUMENTS

| | | | | |
|---|---|---|---|---|
| 2019/0101751 | A1* | 4/2019 | Chou | G02B 27/0101 |
| 2021/0192699 | A1* | 6/2021 | Min | G06T 5/40 |
| 2024/0038181 | A1* | 2/2024 | Noami | G09G 3/3413 |
| 2024/0339068 | A1* | 10/2024 | Sun | G09G 3/2092 |

* cited by examiner

*Primary Examiner* — Roy P Rabindranath
(74) *Attorney, Agent, or Firm* — Leydig, Voit & Mayer, Ltd.

(57) ABSTRACT

A method includes processing input image data to produce resulting image data corresponding to a resulting image such that a first region of the resulting image is filled with black pixels. The method further includes driving a display panel based on the resulting image data. The method further includes producing black pixel pattern data indicative of an arrangement of the black pixels in the resulting image. The method further includes controlling, based on the resulting image data and the black pixel pattern data, luminance levels of one or more of a plurality of light sources of a backlight device configured to illuminate the display panel.

19 Claims, 16 Drawing Sheets

LOCAL DIMMING FOR DISPLAY DEVICES WITH IMAGE WARPING FUNCTION

TECHNICAL FIELD

This disclosure relates generally to display devices and more particularly to local dimming for display devices with an image warping function.

BACKGROUND

Some display devices are configured to display images on curved display screens. One example is head-up displays (HUD) mounted on automotive vehicles. An automotive HUD may be configured to use a curved windshield as a display screen to present information that assists in driving the automotive vehicle, such as the speed of the automotive vehicle and navigation information. The use of a curved display screen may however cause the user to see a distorted image. For example, when a display image that is originally rectangular is displayed on a curved display screen, the user may see the display image as a non-rectangular image with curved sides. The image distortion caused by the curvature of the display screen may be undesirable for the user to properly extract information from the image.

One countermeasure to the image distortion caused by the curved display screen is to perform "image warping" to compensate for the curvature of the curved display screen. Image warping is a type of image processing that corrects the image distortion through a geometric transformation, such as a homography transformation and a perspective transformation. Image warping may be performed based on the shape (e.g., the curvature) of the curved display screen such that the resulting warped image is viewed as a distortion-corrected image on the curved display screen. For example, an automotive HUD device may be configured to perform image warping to produce warped images that compensate for the curvature of the windshield so that the driver can clearly see the corrected images from any angle.

In some implementations, a display device may be based on a light-transmissive display panel, such as a light-transmissive liquid crystal display (LCD) panel. In such implementations, the display device may include a backlight device configured to illuminate the light-transmissive display panel. For example, an automotive HUD device configured to project a display image onto a windshield may include a light-transmissive LCD panel and a backlight device configured to emit light such that the emitted light partially passes through the light-transmissive LCD panel to form a display image on the windshield.

The backlight device may include a two-dimensional (2D) array of light sources (e.g., light-emitting diodes (LEDs)) that illuminate respective zones of the light-transmissive display panel. The use of a 2D light source array enables the implementation of a local dimming function that can achieve high dynamic contrast and low power consumption by individually controlling the respective light sources of the 2D light source array in accordance with input image data. The implementation of the local dimming function may be particularly advantageous in automotive HUD applications, because a backlight device used in an automotive HUD device may be designed to emit high-intensity light to project the display image onto the windshield.

SUMMARY

This summary is provided to introduce, in a simplified form, a selection of concepts that will be further described below. This summary is not necessarily intended to identify key features or essential features of the present disclosure. The present disclosure may include the following various aspects and embodiments.

In an exemplary embodiment, the present disclosure provides a method. The method includes processing input image data to produce resulting image data corresponding to a resulting image such that a first region of the resulting image is filled with black pixels. The method further includes driving a display panel based on the resulting image data. The method further includes producing black pixel pattern data indicative of an arrangement of the black pixels in the resulting image. The method further includes controlling, based on the resulting image data and the black pixel pattern data, luminance levels of one or more of a plurality of light sources of a backlight device configured to illuminate the display panel.

In another exemplary embodiment, the present disclosure provides a display device that includes a display panel, a backlight device, and a display driver. The backlight device includes a plurality of light sources configured to illuminate the display panel. The display driver is configured to process input image data to produce resulting image data corresponding to a resulting image such that a first region of the resulting image is filled with black pixels. The display driver is further configured to drive the display panel based on the resulting image data. The display driver is further configured to produce black pixel pattern data indicative of an arrangement of the black pixels in the resulting image. The display driver is further configured to control, based on the resulting image data and the black pixel pattern data, luminance levels of one or more of the plurality of light sources of the backlight device configured to illuminate the display panel.

In another exemplary embodiment, the present disclosure provides a display driver that includes image data processing circuitry and drive circuitry. The image data processing circuitry is configured to process input image data to produce resulting image data corresponding to a resulting image such that a first region of the resulting image is filled with black pixels. The image data processing circuitry is further configured to produce black pixel pattern data indicative of an arrangement of the black pixels in the resulting image. The image data processing circuitry is further configured to control, based on the resulting image data and the black pixel pattern data, luminance levels of one or more a plurality of light sources of a backlight device configured to illuminate a display panel.

Other features and aspects are described in more detail below with reference to the attached drawings.

Figure 1:
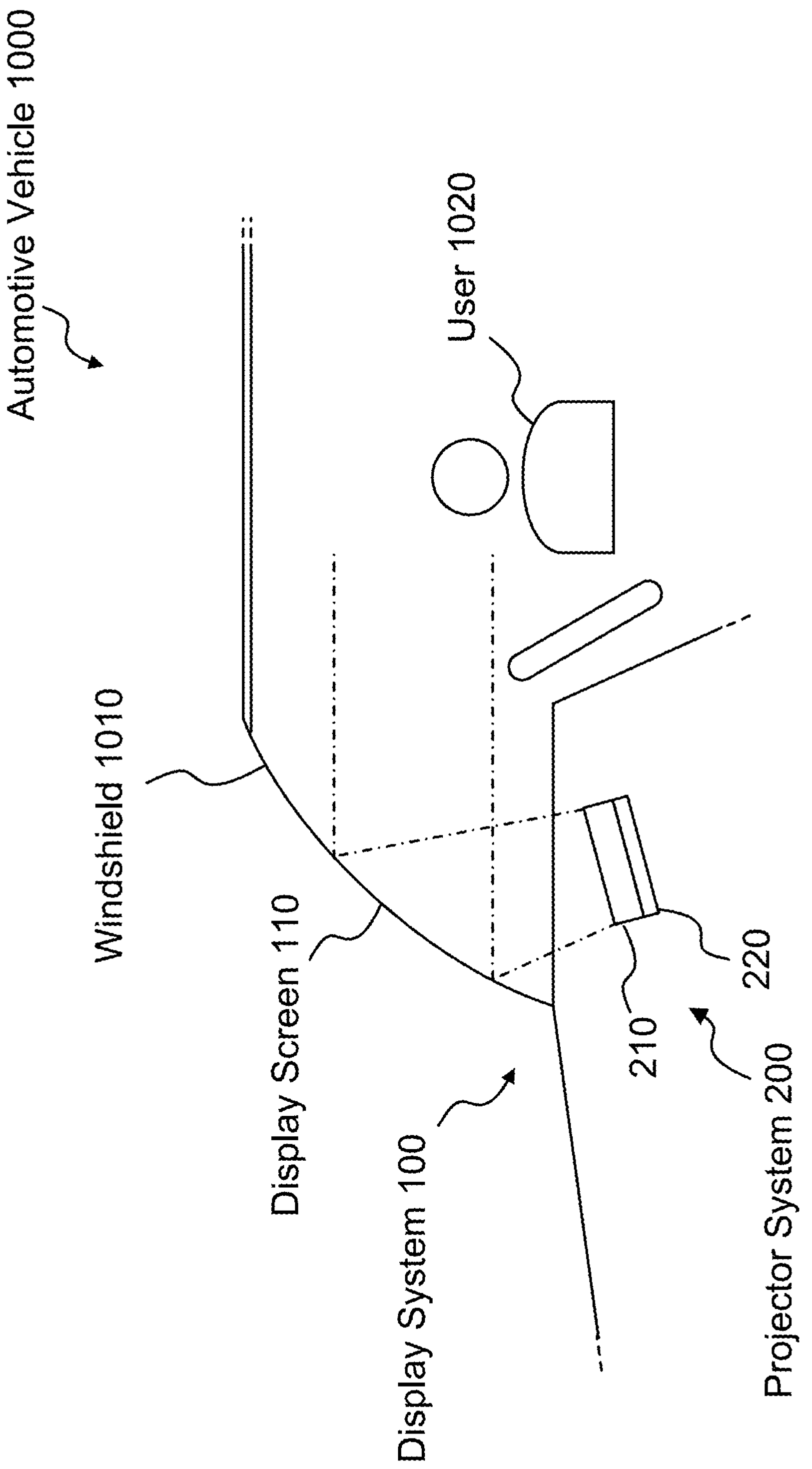
FIG. 1 shows an example display system having a curved display screen, according to one or more embodiments.

For ease of understanding, where possible, identical reference numerals have been used to designate elements that are common to the figures. It is contemplated that elements disclosed in one embodiment may be utilized in other embodiments without specific recitation. The drawings referenced herein are not to be construed as being drawn to scale unless specifically noted. In addition, the drawings are often simplified and details or components are omitted for clarity of presentation and explanation. The drawings and discussion serve to explain principles discussed below.

DETAILED DESCRIPTION

The following detailed description is exemplary in nature and is not intended to limit the disclosure or the applications and uses of the disclosure. Further, there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail so as not to unnecessarily complicate the description.

The term "coupled" as used herein means connected directly to or connected through one or more intervening components or circuits. Further, ordinal numbers (e.g., first, second, third, etc.) may be used throughout the application as an adjective for an element (i.e., any noun in the application). The use of ordinal numbers is not intended to imply or create any particular ordering of the elements nor to limit any element to being only a single element unless expressly disclosed, such as by the use of the terms "before", "after", "single", and other such terminology. Rather, the use of ordinal numbers is intended to distinguish between the elements. By way of an example, a first element is distinct from a second element, and the first element may encompass more than one element and succeed (or precede) the second element in an ordering of elements.

Some display devices are configured to display images on curved display screens. For example, an automotive HUD may be configured to use a curved windshield as a display screen and present various information that assists in driving the automotive vehicle, such as the speed of the automotive vehicle and navigation information, on the curved windshield to allow the driver to view the presented information with reduced eye movements. In other examples, a large-size panel display device, such as liquid crystal display (LCD) devices and organic light emitting diode (OLED) display devices, may be configured to display images on a curved display panel.

FIG. 1 shows an example display system 100 having a curved display screen, according to one or more embodiments. The display system 100 is configured as an automotive head-up display (HUD) mounted on an automotive vehicle 1000, which uses a portion of a curved windshield 1010 as a display screen 110. In the shown embodiment, the display system 100 includes a projector system 200 configured to project a display image onto the curved display screen 110.

Figure 2:
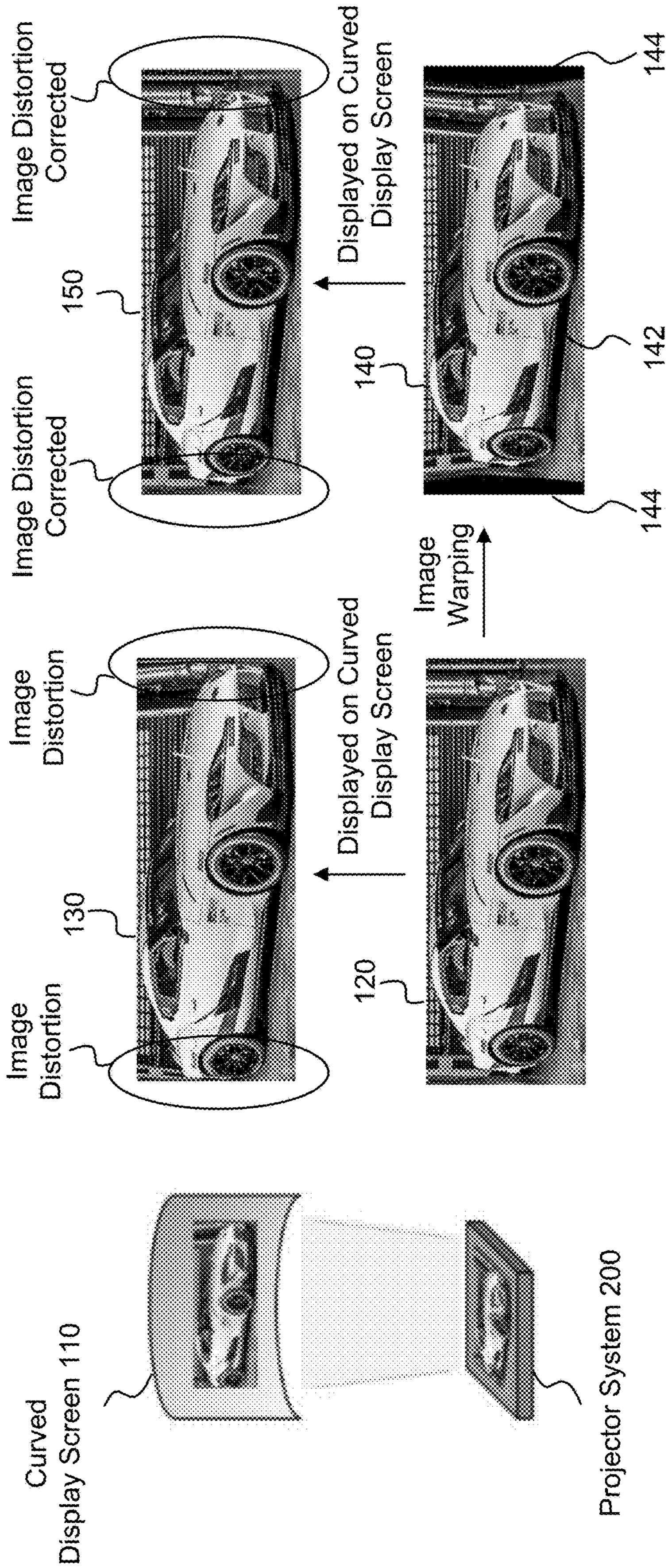
FIG. 2 shows an example of image distortion caused by a curved display screen and image warping for correcting the image distortion, according to one or more embodiments.

One potential problem is that displaying an image on the curved display screen 110 may cause the user to see a distorted image. FIG. 2 shows an example of image distortion caused by the curvature of the display screen 110. When an input image 120 is projected onto the curved display screen 110, the display image 130 is distorted in accordance with the curvature of the display screen 110. The image distortion may be particularly significant at the ends of the display image 130. The image distortion caused by the curvature of the display screen 110 may be undesirable for the user to properly extract information from the image, thereby degrading the user experience. For example, if a map is displayed on the curved display screen 110 with distortion, it may prevent the user from properly extracting location information from the displayed map.

In one or more embodiments, to address image distortion caused by the curvature of the display screen 110, the display system 100 may be configured to perform image warping processing on the input image 120 to correct the image distortion potentially caused by the curvature of the display screen 110, as shown in the lower portion of FIG. 2. In the shown embodiment, the display system 100 is configured to perform image warping processing on the input image 120, thereby producing a resulting image 140 that includes the warped image 142, which is the warped version of the input image 120. The image warping may be performed to compensate for the curvature of the display screen 110 so that the image distortion is corrected when the display image 150 corresponding to the resulting image 140 is projected onto the display screen 110 by the projector system 200. This allows the user to see the distortion corrected display image 150 on the display screen 110. It should be noted that although the embodiments described above are based on the projector system 200 for an automotive HUD application, the present disclosure may be applicable to any display system having a curved display screen.

In some implementations, to facilitate the image processing, the resulting image 140 may be rendered as a rectangular image by incorporating one or more black pixel regions 144 filled with "black pixels" in addition to the warped image 142. It should be noted that rectangular images are much easier to handle in image processing than non-rectangular images. As used herein, a "black pixel" is a pixel of zero luminance. In implementations where pixel data for each pixel of the resulting image 140 is represented by red (R), green (G), and blue (B) graylevels, a "black pixel" may be a pixel for which the R, G, and B graylevels are all zero. The shapes of the one or more black pixel regions 144 may be based on the shape (or curvature) of the display screen 110. In the embodiment shown in FIG. 2, the resulting image 140 includes two black pixel regions 144 at both horizontal ends of the resulting image 140. The black pixel regions 144 fill the portions of the resulting image 140 other than the warped image 142 such that the warped image 142 and the black pixel regions 144 form the rectangular shape of the resulting image 140.

Referring back to FIG. 1, in one or more embodiments, the projector system 200 may include a light-transmissive display panel 210 and a backlight device 220 configured to emit light and illuminate the display panel 210. The display panel 210 may be a light-transmissive LCD panel. The light emitted by the backlight device 220 partially passes through the display panel 210 and forms the display image on the curved display screen 110.

Figure 3:
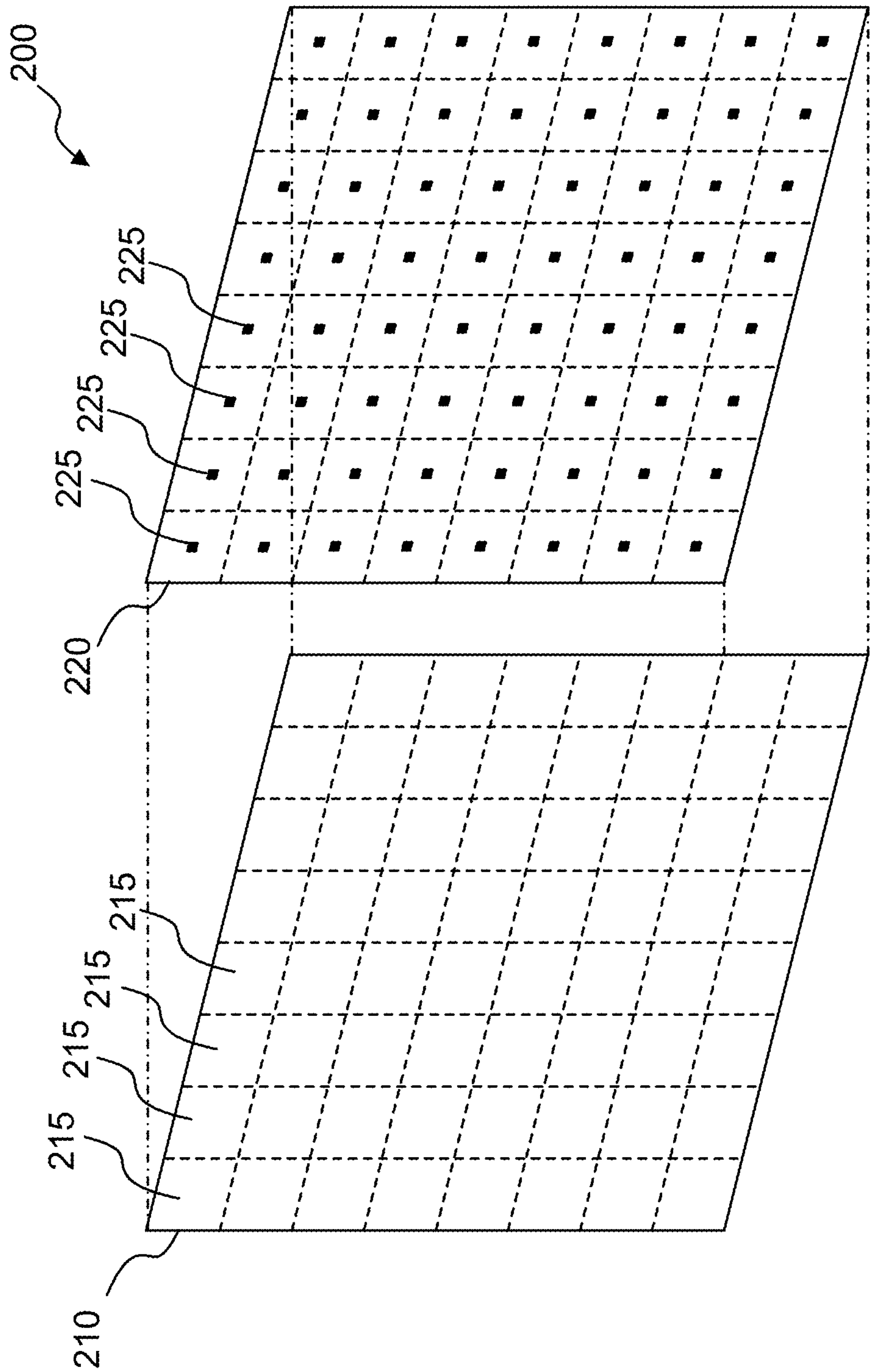
FIG. 3 shows an example configuration of a backlight device, according to one or more embodiments.

FIG. 3 shows an example configuration of the backlight device 220, according to one or more embodiments. In the shown embodiment, the backlight device 220 includes a two-dimensional (2D) array of light sources 225 that illuminate respective zones 215 of the display panel 210. Each light source 225 may include one or more light emitting diodes (LEDs) or other light emitting elements. The use of the 2D light source array enables the implementation of a local dimming function that can achieve high dynamic contrast and low power consumption by individually controlling the respective light sources 225 of the 2D light source array. The local dimming function may control the luminance level of each light source 225 based on the luminance of the image displayed in the respective zone 215 of the display panel 210 illuminated by that light source 225. The luminance levels of light sources 225 that illuminate zones 215 of the display panel 210 that display bright images may be increased, while the luminance levels of light sources 225 that illuminate zones 215 of the display panel 210 that display dark images may be decreased.

The present disclosure recognizes that incorporating the one or more black pixel regions 144 into the resulting image 140 may cause an undesirable decrease in luminance at one or more edges of the display image 150 when the local dimming function is performed based on the resulting image 140. Incorporating the one or more black pixel regions 144 into the resulting image 140 may decrease the luminance levels of the zones 215 that at least partially overlap the one or more black pixel regions 144, which may cause a decrease in the luminance levels of the light sources 225 corresponding to those zones 215, resulting in a decrease in luminance at the corresponding edges of the display image 150.

Figure 4:
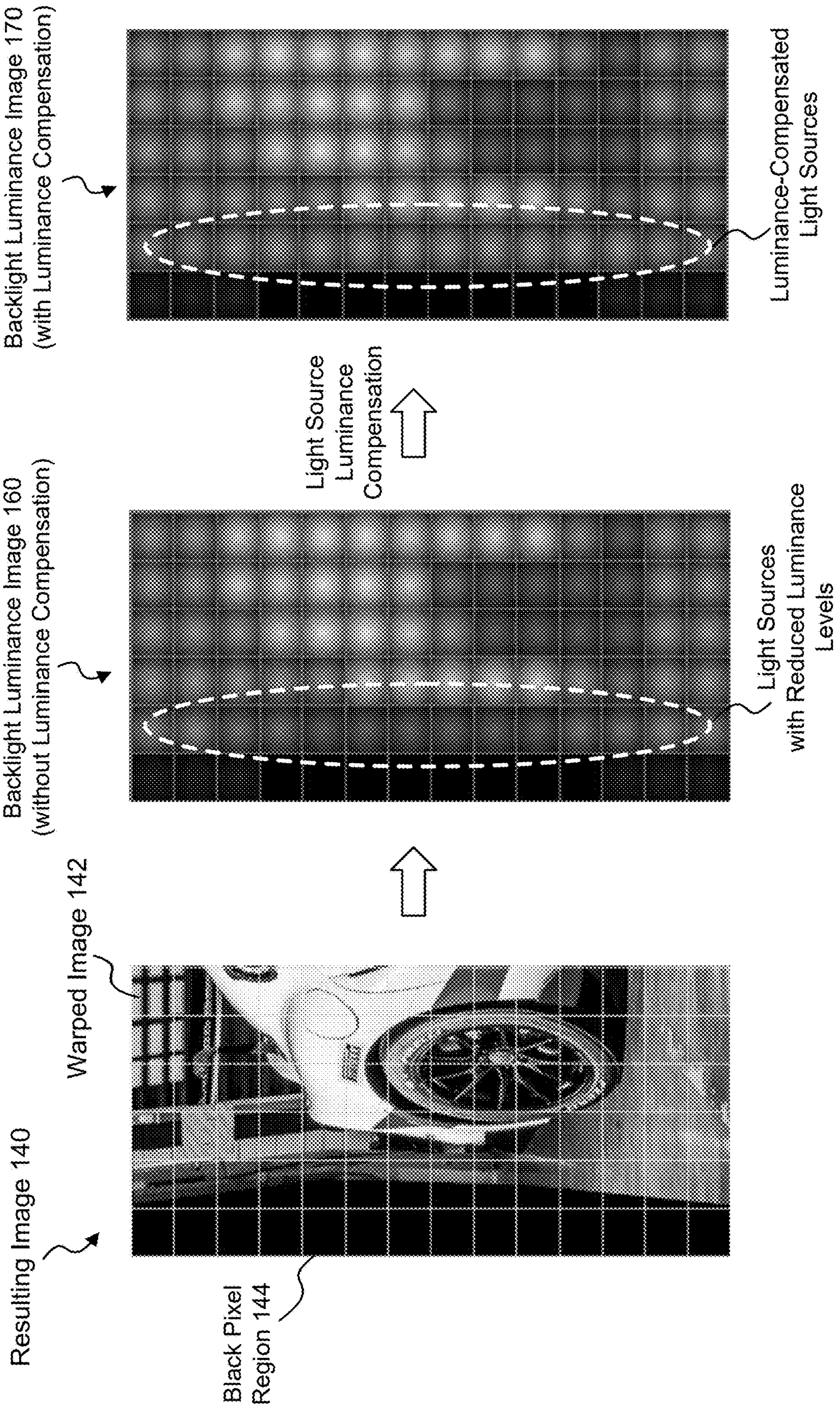
FIG. 4 shows an example distribution of the luminance levels of light sources of a backlight device, according to one or more embodiments.

FIG. 4 shows an example distribution of the luminance levels of the light sources 225 of the backlight device 220 for the left end portion of the resulting image 140 that includes the warped image 142 and the black pixel region 144, according to one or more embodiments. The white lines in the resulting image 140 indicate the boundaries of the zone 215 of the display panel 210 (shown in FIG. 3). Because the images displayed in the zones 215 that at least partially overlap the black pixel region 144 have reduced luminance levels, the light sources 225 corresponding to those zones 215 are driven to reduced luminance levels as shown in the backlight luminance image 160 in FIG. 4. The reduced luminance levels of the light sources 225 may undesirably cause a decrease in the luminance at the edge of the display image 150 corresponding to the boundary between the warped image 142 and the black pixel region 144. This issue may also apply in other cases where the image processing applied to the input image includes incorporation of one or more black pixel regions.

In one or more embodiments, as shown in the backlight luminance image 170 of the right part of FIG. 4, the local dimming function is configured to compensate for decreases in luminance of the relevant light sources 225 to thereby mitigate the decrease in the luminance at an edge of the display image which is potentially caused by the incorporation of a black pixel region. Various embodiments are disclosed below in which the image warping processing incorporates a black pixel region into the resulting image while the local dimming function is configured to compensate for the decrease in the luminance at the corresponding edge of the display image which is potentially caused by the incorporation of the black pixel region.

Figure 5:
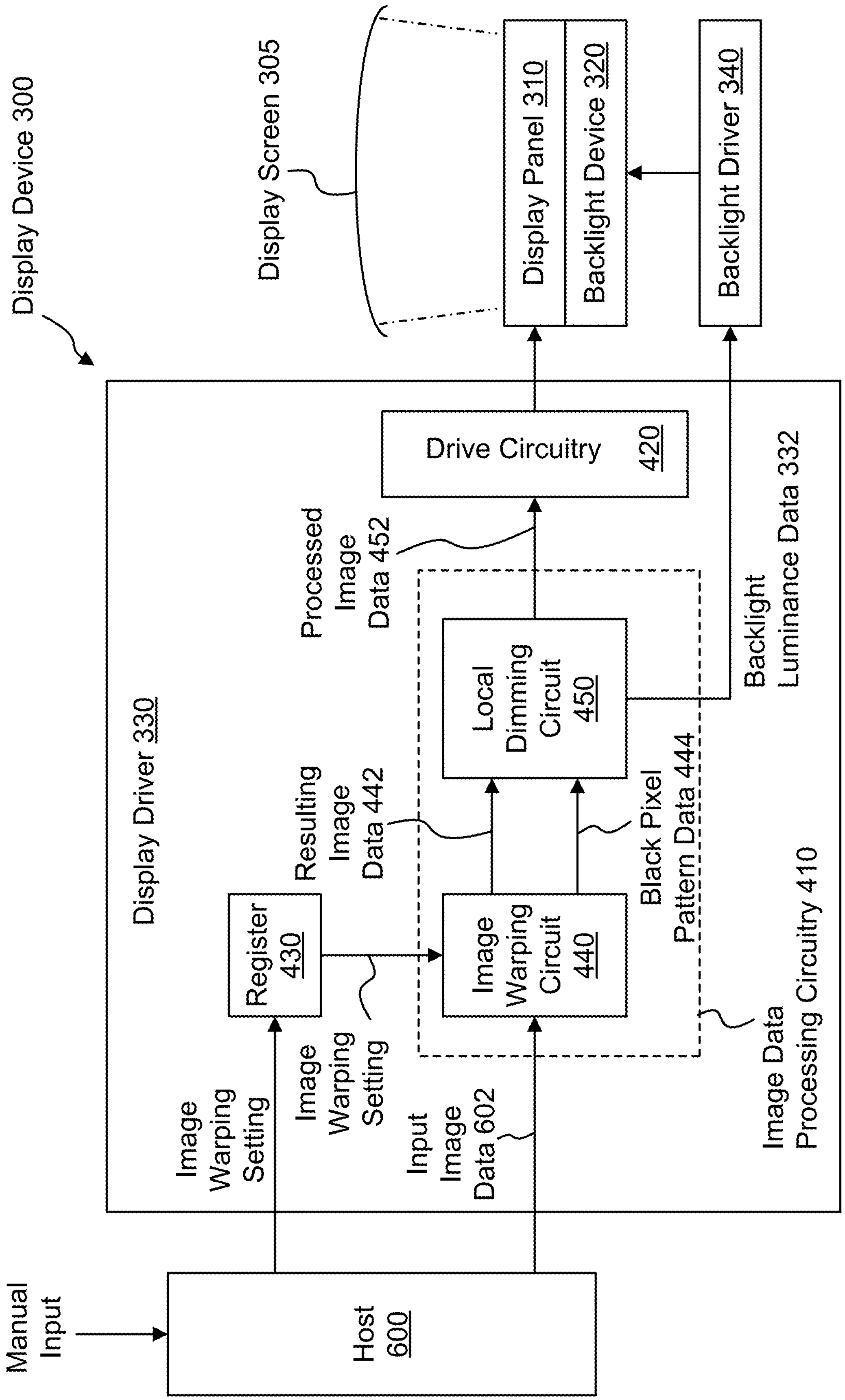
FIG. 5 shows an example configuration of a projector system, according to one or more embodiments.

FIG. 5 shows an example configuration of a display device 300, according to one or more embodiments. The display device 300 is configured as a projector system, which may be one embodiment of the projector system 200 shown in FIGS. 1 and 2. The display device 300 is configured to receive input image data 602 from a host 600 and to project a display image onto a curved display screen 305 based on the input image data 602. The input image data 602, corresponding to an input image, includes pixel data for each pixel of the input image. The display image is an equivalent, but possibly modified, version of the input image. The host 600 may be any type of processor or controller configured to provide the input image data 602, such as an application processor, a central processing unit (CPU), a microcontroller unit (MCU), etc. The display screen 305 may be a portion of a curved windshield of an automobile vehicle as shown in FIG. 1.

In the shown embodiment, the display device 300 includes a light-transmissive display panel 310, a backlight device 320, a display driver 330, and a backlight driver 340. The display panel 310 may be one embodiment of the light-transmissive display panel 210 shown in FIGS. 1 and 3. The display panel 310 may be a light-transmissive LCD panel.

Figure 6A:
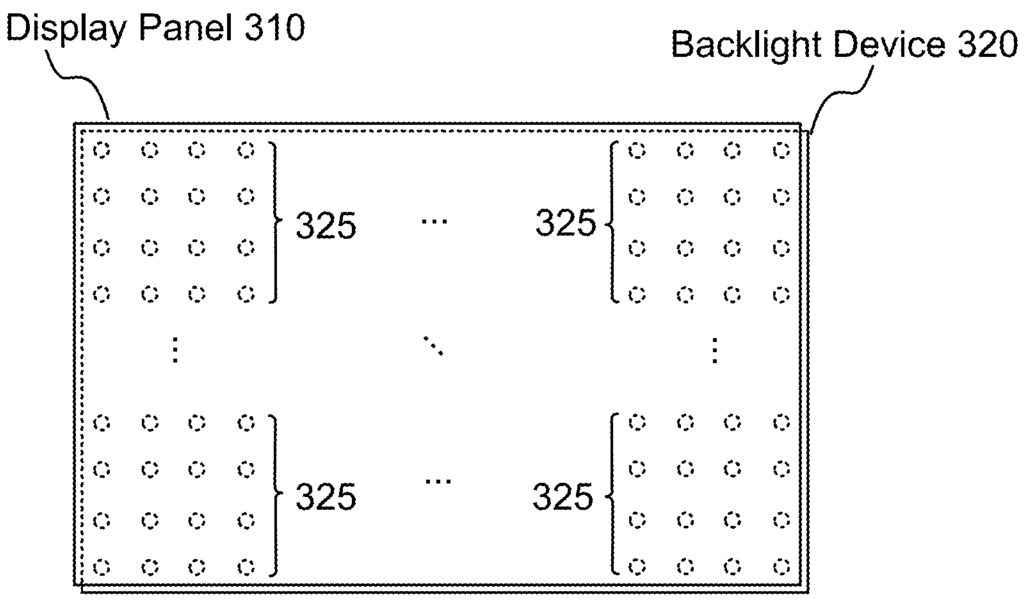
FIG. 6A shows an example configuration of a backlight device, according to one or more embodiments.
Figure 6B:
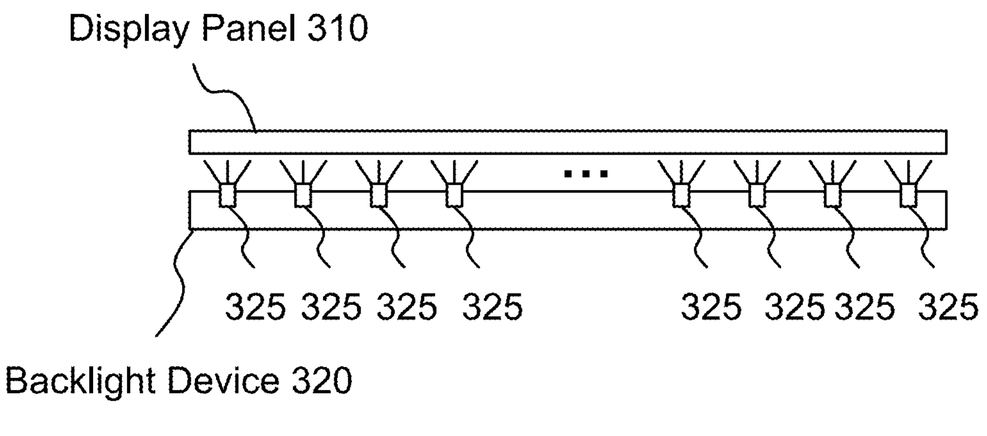
FIG. 6B shows an example side view of the backlight device of FIG. 6A, according to one or more embodiments.

The backlight device 320 is configured to emit light and illuminate the display panel 310. The light emitted by the backlight device 320 partially passes through the display panel 310 and forms the display image on the display screen 305. FIG. 6A shows an example configuration of the backlight device 320, according to one or more embodiments. The backlight device 320 includes a two-dimensional (2D) array of light sources 325. It is noted that the light sources 325 are shown in phantom in FIG. 6A because the light sources 325 are located below or behind the display panel 310 as shown in FIG. 6B, which shows an example side view of the backlight device 320. While 64 light sources 325 are shown in FIG. 6A, those skilled in the art would appreciate that the backlight device 320 may include more or less than 64 light sources 325. In actual implementations, the backlight device 320 may include from several hundred to several thousand light sources 325.

Referring back to FIG. 5, the display driver 330 is configured to drive the display panel 310 based on the input image data 602 and is also configured to control the luminance levels of the respective light sources 325 of the backlight device 320 by providing backlight luminance data 332 based on the input image data 602 to the backlight driver 340. In one implementation, the backlight luminance data 332 may indicate specified luminance levels of the respective light sources 325, and the backlight driver 340 may be configured to drive the respective light sources 325 as specified by the backlight luminance data 332. The display driver 330 provides the local dimming function by individually controlling the luminance levels of the respective light sources 325 with the backlight luminance data 332.

In the shown embodiment, the display driver 330 includes image data processing circuitry 410 and drive circuitry 420. In one implementation, the display driver 330 may be configured as a display driver integrated circuit (DDIC) that is separate from the host 600. The image data processing circuitry 410 includes an image warping circuit 440 and a local dimming circuit 450. The image warping circuit 440 is configured to apply image warping processing to the input image data 602 to produce resulting image data 442 corresponding to a resulting image that includes a warped version of the input image. The resulting image data 442 may include pixel data for each pixel of the resulting image.

Figure 7A:
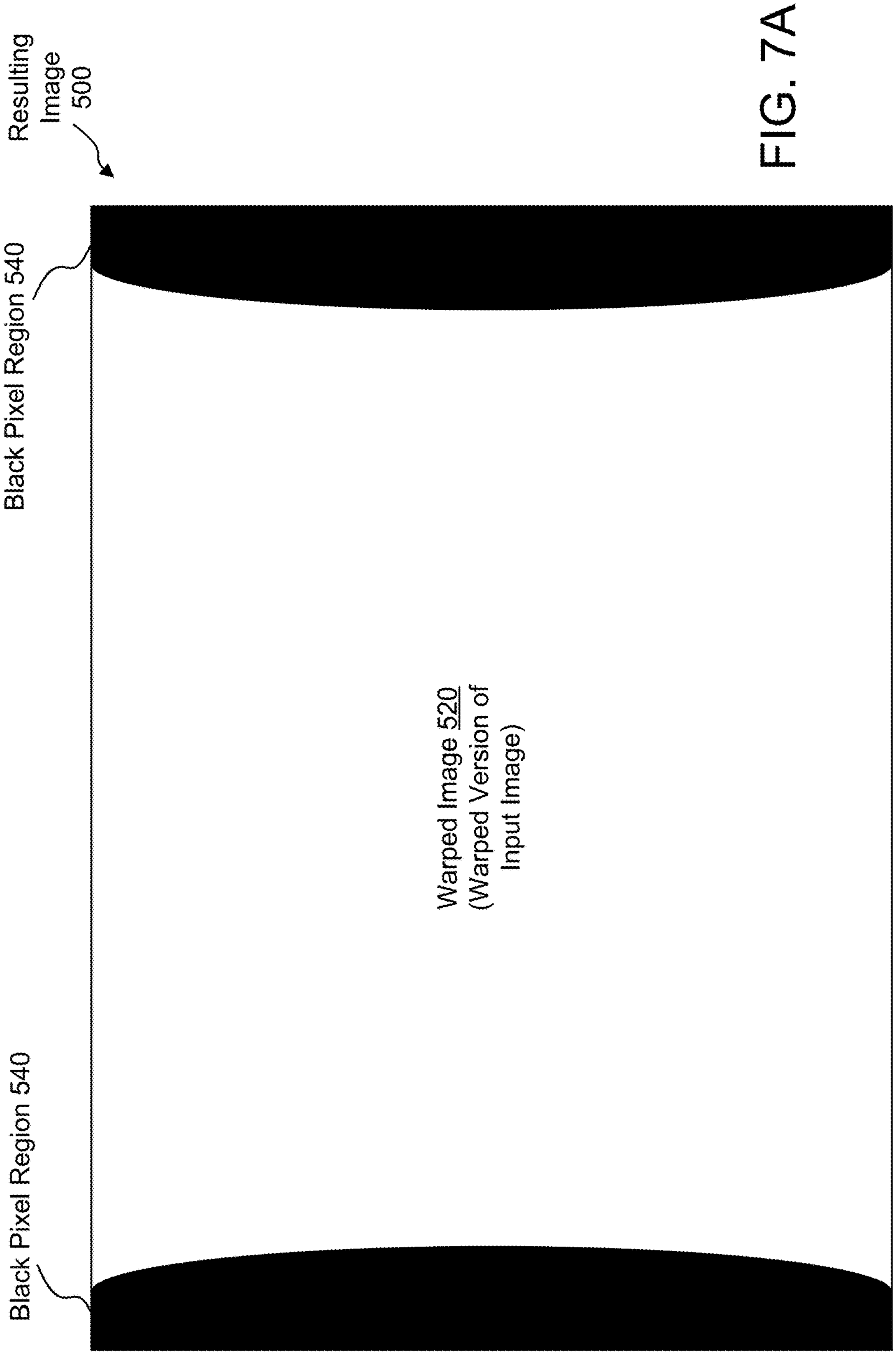
FIG. 7A shows an example of a resulting image produced by an image warping circuit, according to one or more embodiments.

FIG. 7A shows an example of a resulting image produced by the image warping circuit 440, according to one or more embodiments. In the shown embodiment, the resulting image, denoted by numeral 500 in FIG. 7A, is a rectangular image that includes a warped image 520, which is a warped version of the input image, and one or more black pixel regions 540 filled with black pixels. As discussed above, a black pixel referred to herein is a pixel of zero luminance, and in implementations where pixel data for each pixel of the resulting image data 442 includes red (R), green (G), and blue (B) graylevels, a "black pixel" may be a pixel for which the R, G, and B graylevels are all zero. In the shown embodiment, the resulting image 500 includes two black pixel regions 540. The shapes of the black pixel regions 540 may be based on the shape (or curvature) of the display screen 305. The black pixel regions 540 fill the portions of the resulting image 500 other than the warped image 520 such that the warped image 520 and the black pixel regions 540 form the rectangular shape of the resulting image 500.

Referring back to FIG. 5, the image warping circuit 440 is further configured to produce black pixel pattern data 444 indicative of the black pixel pattern of the resulting image. The black pixel pattern referred to herein is the arrangement of the black pixels introduced into the resulting image during the image warping processing. In one implementation, the black pixel pattern data 444 includes a plurality of bits corresponding respectively to pixels of the resulting image, and each of the plurality of bits indicates whether a corresponding one of the pixels of the resulting image is one of the black pixels.

In some implementations, the image warping circuit 440 may be configured to perform the image warping processing based on an image warping setting stored in a register 430. The image warping setting may indicate how the input image is to be warped or distorted to produce the warped image 520, which is incorporated into the resulting image 500. In implementations where the image warping processing is achieved by a geometric transformation, such as a homography transformation and a perspective transformation, the image warping setting may include parameters used for the geometric transformation. In some implementations, the image warping processing may involve defining a source grid that divides the input image into source cells and a target grid that divides the warped image into target cells one-to-one corresponding to the source cells and generating the target cells of the warped image by applying geometric transformations to the source cells of the input image. In such implementations, the image warping setting may include the definitions of the target and source grids, such as the locations of the nodes (or knots) of the target and source grids.

In some embodiments, the display device 300 may be configured to adjust the image warping in response to a manual input. For example, in embodiments where the display device 300 is used as the projector system 200 shown in FIG. 1, the display device 300 may be configured to adjust the image warping (e.g., how the input image is warped by the image warping processing) based on a manual input from the user (e.g., the driver of the automotive vehicle 1000). In such embodiments, the host 600 may be configured to update the image warping setting stored in the register 430 in response to the manual input. This allows the user to adjust the image warping processing to optimize the display image displayed on the curved display screen 305. In embodiments where the image warping is adjustable in response to the manual input, the shapes of the warped image 520 and the black pixel regions 540 may vary based on the manual input.

Continuing to refer to FIG. 5, the local dimming circuit 450 is configured to produce and provide the backlight luminance data 332 to the backlight driver 340 based on the resulting image data 442 and the black pixel pattern data 444 to control one or more of the luminance levels of the light sources 325 of the backlight device 320. As discussed above, the backlight luminance data 332 may include specified luminance levels of the respective light sources 325. The local dimming circuit 450 is configured to provide the local dimming function by individually controlling the luminance levels of the respective light sources 325 of the backlight device 320 based on the resulting image data 442. Further, the local dimming circuit 450 uses the black pixel pattern data 444 to compensate for the decrease in the luminance at the edge of the display image on the display screen 305 which may be caused by the incorporation of the black pixel regions 540 in the resulting image 500.

The local dimming circuit 450 is further configured to apply image processing to the resulting image data 442 to produce processed image data 452. The processed image data 452 is provided to the drive circuitry 420, which is configured to drive the display panel 310 based on the processed image data 452.

Figure 7B:
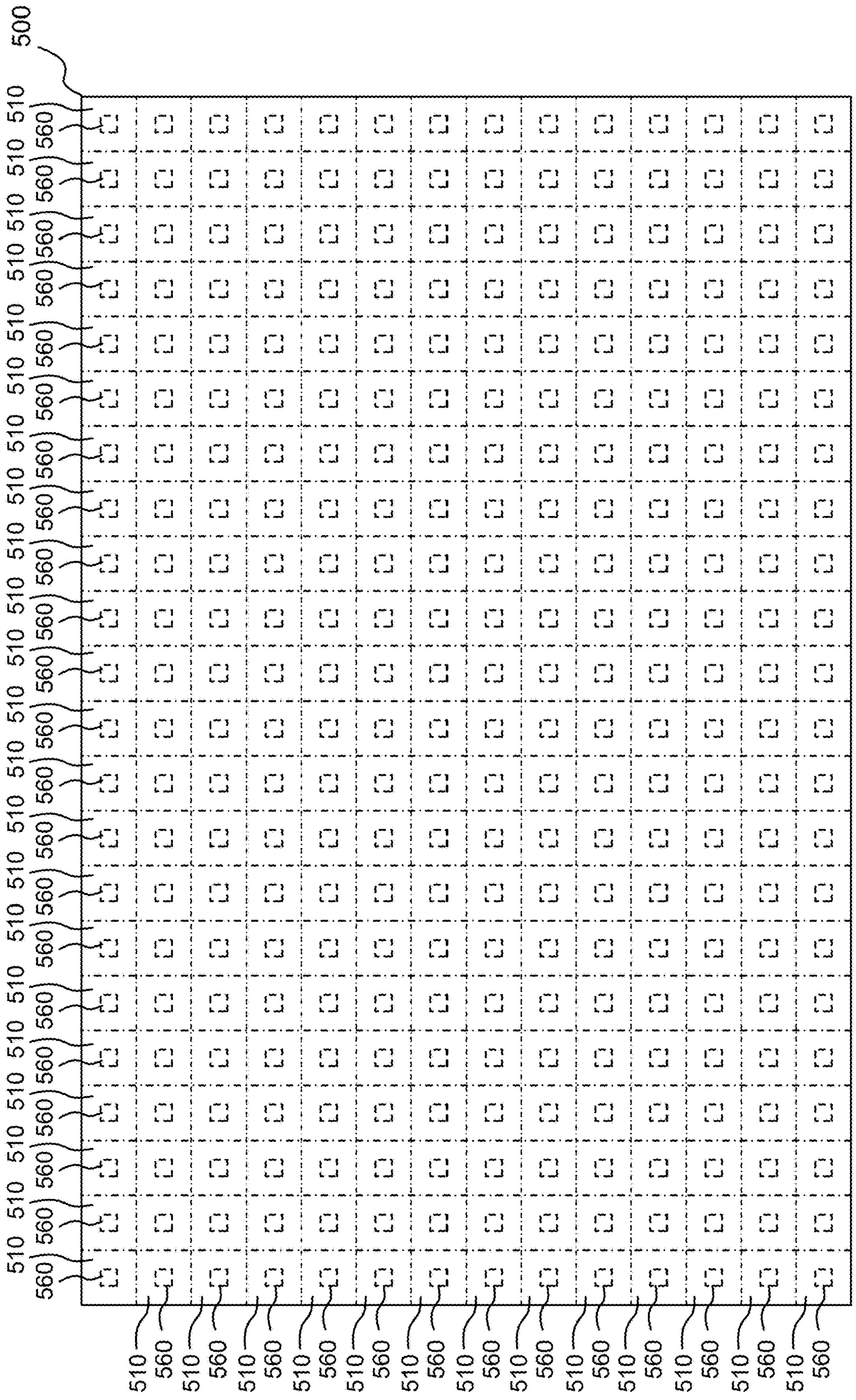
FIG. 7B shows an example definition of zones for the resulting image, according to one or more embodiments.

Both the generation of the backlight luminance data 332 for the local dimming function and the generation of the processed image data 452 by performing the image processing on the resulting image data 442 may be based on "zones" which is defined by segmenting the resulting image 500. FIG. 7B shows an example of the definition of zones 510 for the resulting image 500, according to one or more embodiments. In the shown embodiment, the zones 510 have a rectangular (e.g., square) shape and are arranged in rows and columns. The zones 510 correspond one-to-one to the light sources 325, and the dotted squares 560 indicate the corresponding locations of the light sources 325 in the resulting image 500. More specifically, when the resulting image 500 is displayed on the display panel 310, the projection of each light source 325 onto the resulting image 500 falls within the corresponding one of the zones 510 of the resulting image 500 corresponding to that light source 325. Although FIG. 7B shows that the zones 510 have the same rectangular or square shape, the shape of a first set of zones 510 may be different from the shape of a second set of zones 510.

Figure 8:
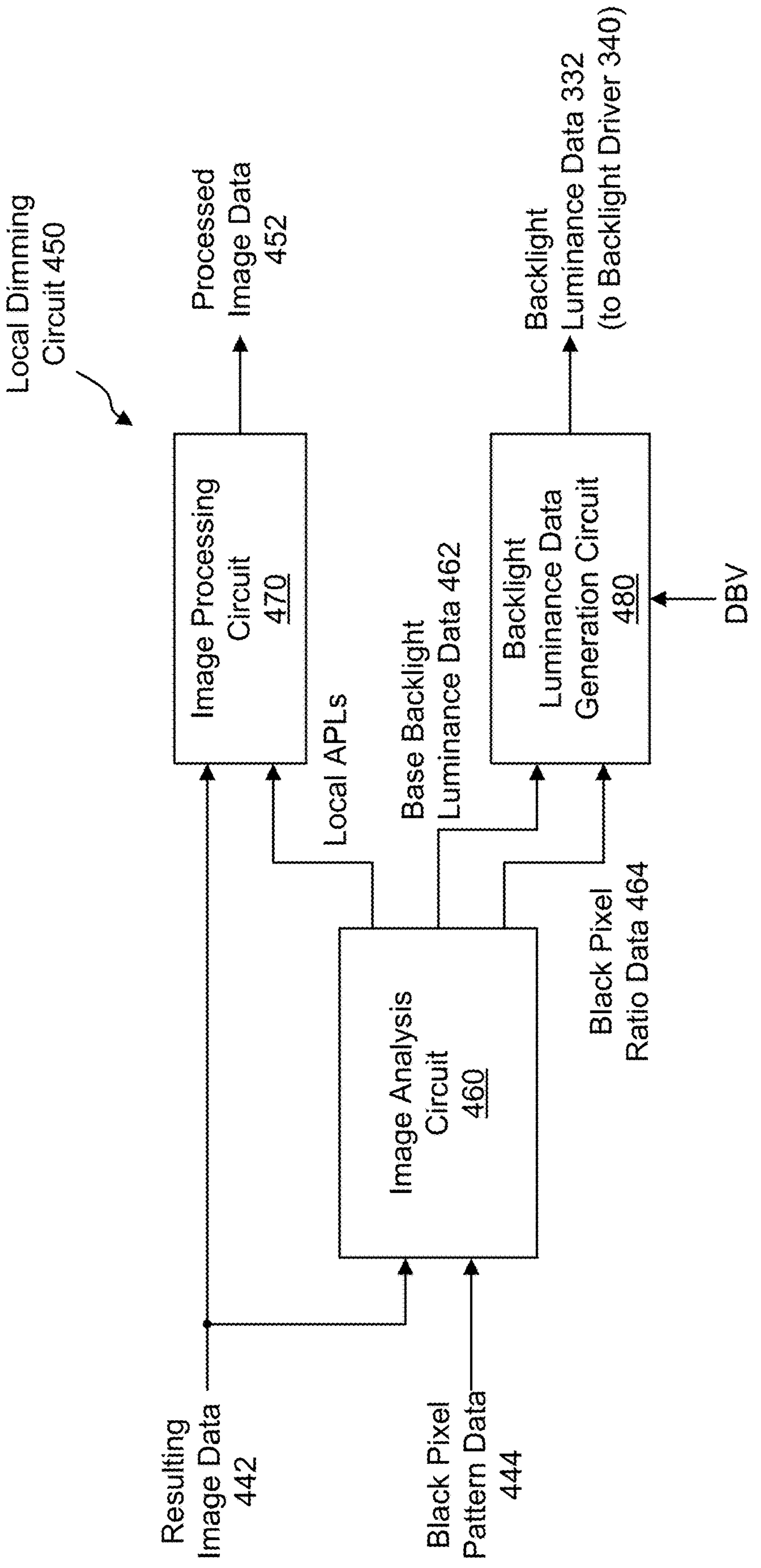
FIG. 8 shows an example configuration of a local dimming circuit, according to one or more embodiments.

FIG. 8 shows an example configuration of the local dimming circuit 450, according to one or more embodiments. In the shown embodiment, the local dimming circuit

450 includes an image analysis circuit 460, an image processing circuit 470, and a backlight luminance data generation circuit 480.

In the shown embodiment, the image analysis circuit 460 is configured to analyze the resulting image data to calculate local average picture levels (APLs) of the respective zones 510. In some implementations, the image analysis circuit 460 may be configured to calculate the local APL of each zone 510 as the average of the luminance levels of the respective pixels of that zone 510 based on the pixel data of the pixels of that zone 510 contained in the resulting image data 442. In other implementations, the image analysis circuit 460 may be configured to calculate the local APL of each zone 510 as a weighted average of the luminance levels of the respective pixels of that zone 510, wherein the weights assigned to the respective pixels are determined such that the weights assigned to the respective pixels have smaller values as the respective distances between the respective pixels and the projection of the light source 325 corresponding to that zone 510 onto the resulting image 500 increase. In still other implementations, the image analysis circuit 460 may be configured to calculate the local APL of each zone 510 as a weighted average of the luminance levels of the respective pixels of that zone 510 and its surrounding zones 510, wherein the weights assigned to the respective pixels are determined such that the weights assigned to the respective pixels have smaller values as the respective distances between the respective pixels and the projection of the light source 325 corresponding to that zone 510 onto the resulting image 500 increase. The local APLs of the respective zones 510 are provided to the image processing circuit 470 and used to process the resulting image data 442. In one implementation, the image processing circuit 470 may be configured to process the resulting image data 442 for pixels in each zone 510 based on the local APL of that zone 510 to produce the processed image data 452. The image processing performed by the image processing circuit 470 may include color adjustment, demura correction, deburn correction, image scaling, gamma transformation, or other image processing. In one implementation, the gamma transformation for pixels in each zone 510 may be adjusted based on the local APL of that zone 510.

The image analysis circuit 460 is further configured to produce and provide base backlight luminance data 462 to the backlight luminance data generation circuit 480 based on the resulting image data 442. In some embodiments, the base backlight luminance data 462 may include base luminance levels of the respective light sources 325. The base luminance level of each light source 325 may be determined based on pixel data of the pixels of the zone 510 corresponding to that light source 325. In some implementations, the base luminance level of each light source 325 may be determined based on the local APL of the zone 510 corresponding to that light source 325. In one implementation, the base luminance level of a light source 325 may have a greater value as the local APL of the zone 510 corresponding to that light source 325 increases. The base luminance levels of the respective light sources 325 may be used by the backlight luminance data generation circuit 480 to determine the specified luminance levels of the respective light sources 325 included in the backlight luminance data 332, which is provided to the backlight driver 340.

Figure 9:
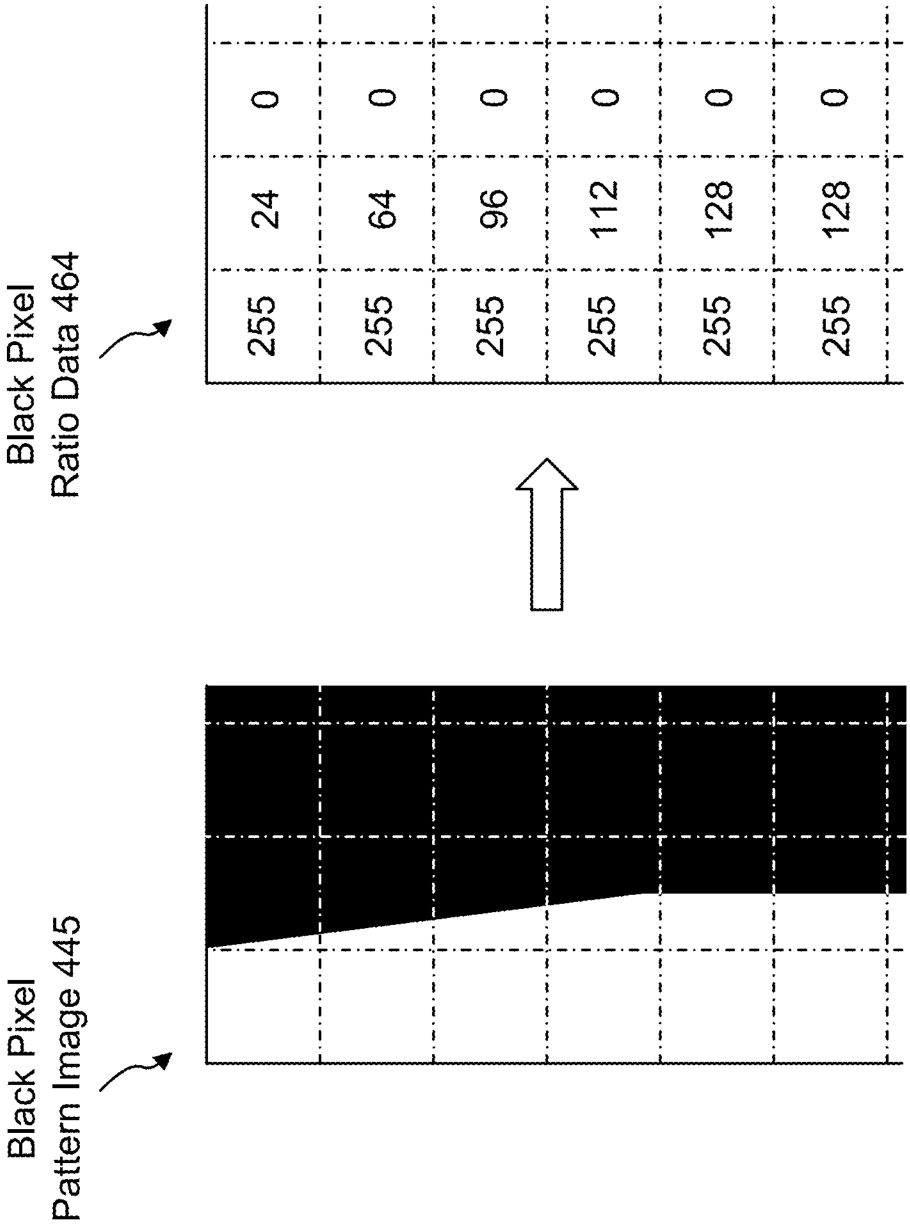
FIG. 9 shows an example of black pixel ratio data, according to one or more embodiments.

The image analysis circuit 460 is further configured to produce black pixel ratio data 464 which describes the black pixel ratio of each zone 510. The black pixel ratio of a zone 510 of interest is the ratio of the number of the black pixels in that zone 510 to the total number of the pixels of that zone 510. FIG. 9 shows an example of the black pixel ratio data 464, according to one or more embodiments. The left part of FIG. 9 shows an example of a black pixel pattern image 445, which is a binary image corresponding to the black pixel pattern data 444, according to one or more embodiments. The white part of the black pixel pattern image 445 indicates the region filled with the black pixels by the image warping processing, and the black part of the black pixel pattern image 445 indicates the remaining region in which the warped image is incorporated. The right part of FIG. 9 shows an example content of the black pixel pattern image 445, according to one or more embodiments. In the shown embodiment, the black pixel ratio of each zone 510 is normalized to a value between 0 and 255, inclusive. The ratio "255" indicates that 100% (i.e., (255/255)×100%) of the pixels of the relevant zone 510 are the black pixels introduced by the image warping processing, while the ratio "0" indicates that 0% (i.e. (0/255)×100%) of the pixels of the relevant zone 510 are the black pixels introduced by the image warping processing. Further, the ratio "24" indicates 9.4% (i.e., (24/255)×100%) of the pixels of the relevant zone 510 are the black pixels introduced by the image warping processing. A similar applies to other values of the black pixel ratio. In one implementation, the image analysis circuit 460 may be configured to count the number of the black pixels contained in each zone 510 of the resulting image based on the black pixel pattern data 444 and to calculate the black pixel ratio of each zone 510. The black pixel ratio data 464 is provided to the backlight luminance data generation circuit 480 and used to produce the backlight luminance data 332.

Referring back to FIG. 8, the backlight luminance data generation circuit 480 is configured to produce the backlight luminance data 332 based on the base backlight luminance data 462, the black pixel ratio data 464, and a display brightness value (DBV). The DBV referred to herein is a value that specifies a desired display brightness level of the display device 300, wherein the display brightness level referred to herein is the overall brightness level of the display image displayed on the display screen 305. The DBV may be generated by an external controller, such as the host 600 (shown in FIG. 5) based on a manual input. For example, when a command to adjust the display brightness level is manually entered into an input device, the DBV may be generated based on that command. In one or more embodiments, the backlight luminance data generation circuit 480 may be configured to determine the specified luminance levels for the respective light sources 325 contained in the backlight luminance data 332 by modifying the base luminance levels for the respective light sources 325 contained in the base backlight luminance data 462 based on the black pixel ratio data 464 and the DBV. In one implementation, the specified luminance level of a light source 325 of interest may be determined by modifying the base luminance level of the light source 325 of interest based on the DBV and the black pixel ratio of the zone 510 corresponding to the light source 325 of interest.

Figure 10A:
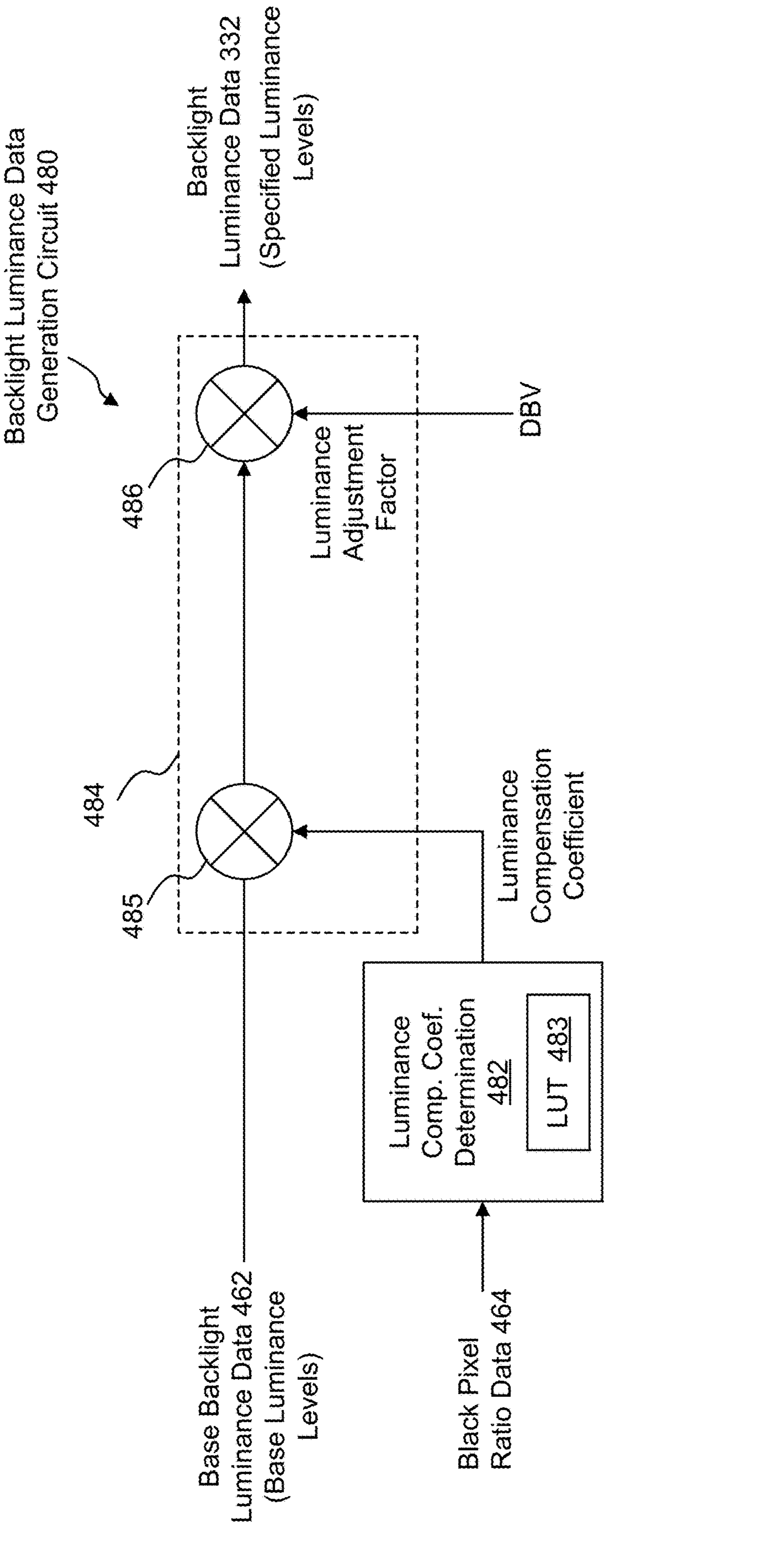
FIG. 10A shows an example configuration of a backlight luminance data generation circuit, according to one or more embodiments.

FIG. 10A shows an example configuration of the backlight luminance data generation circuit 480, according to one or more embodiments. In the shown embodiment, the backlight luminance data generation circuit 480 includes a luminance compensation coefficient determination circuit 482 and a modification circuit 484.

The luminance compensation coefficient determination circuit 482 is configured to receive the black pixel ratio data 464 and determine a luminance compensation coefficient for each light source 325 based on the black pixel ratio of the zone 510 corresponding to that light source 325. In some implementations, the luminance compensation coefficient determination circuit 482 may include a luminance compensation lookup table (LUT) 483 that stores a correlation between values of the luminance compensation coefficient and values of the black pixel ratio. In such implementations, the luminance compensation coefficient determination circuit 482 may be configured to determine the luminance compensation coefficient for each light source 325 by performing a table lookup on the luminance compensation LUT 483 using the black pixel ratio of the zone 510 corresponding to that light source 325. In one implementation, the luminance compensation coefficient for each light source 325 may have a larger value as the black pixel ratio of the zone 510 corresponding to that light source 325 increases.

The modification circuit 484 is configured to determine a luminance adjustment factor based on the DBV and to produce the backlight luminance data 332 by modifying the base backlight luminance data 462 based on the luminance adjustment factor and the luminance compensation coefficient for each light source 325 of the backlight device 320. In one implementation, the luminance adjustment factor may have a larger value as the DBV increases. In one or more embodiments, the modification circuit 484 may be configured to determine the specified luminance level for each light source 325 described in the backlight luminance data 332 by applying the luminance compensation coefficient for that light source 325 and the luminance adjustment factor to the base luminance level for that light source 325. In one implementation, the specified luminance level for each light source 325 may be calculated by multiplying the base luminance level for that light source 325 by the luminance compensation coefficient for that light source 325 and the luminance adjustment factor. In this case, the modification circuit 484 may include a pair of multipliers 485 and 486. The backlight luminance data 332 is provided to the backlight driver 340 and used to control the luminance levels of the respective light sources 325 of the backlight device 320.

Figure 10B:
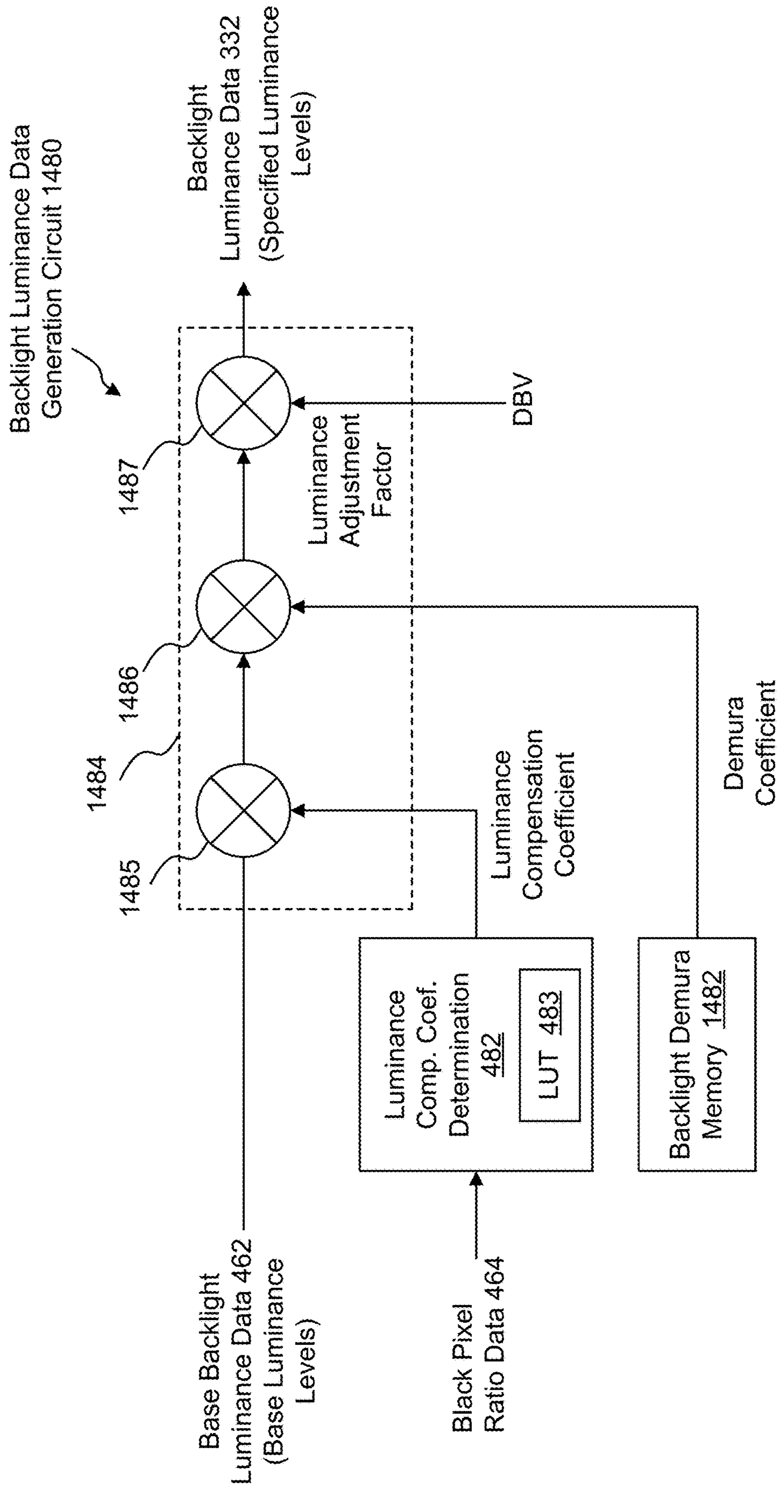
FIG. 10B shows an example configuration of a backlight luminance data generation circuit, according to other embodiments.

FIG. 10B shows an example configuration of the backlight luminance data generation circuit, denoted by numeral 1480, according to other embodiments. In the shown embodiment, the backlight luminance data generation circuit 1480 is configured to provide demura compensation for the light sources 325 of the backlight device 320. The demura compensation is a process for a compensation of luminance unevenness of the light sources 325. The backlight luminance data generation circuit 1480 includes a backlight demura memory 1482 configured to store demura coefficients for the respective light sources 325. The demura coefficients may be prepared and stored in the backlight demura memory 1482 during a test or calibration process prior to shipment. In the shown embodiment, the modification circuit, denoted by numeral 1484, is configured to determine the specified luminance level for each light source 325, which is described in the backlight luminance data 332, by applying the luminance compensation coefficient and demura coefficient for that light source 325 and the luminance adjustment factor to the base luminance level for that light source 325. In one implementation, the specified luminance level for each light source 325 may be calculated by multiplying the base luminance level for that light source 325 by the luminance compensation coefficient for that light source 325, the demura coefficient for that light source 325, and the luminance adjustment factor. In this case, the modification circuit 1484 may include three multipliers 1485, 1486, and 1487. The backlight luminance data 332 including the specified luminance level thus produced for each light source 325 is provided to the backlight driver 340 and used to control the luminance levels of the respective light sources 325 of the backlight device 320.

Figure 11:
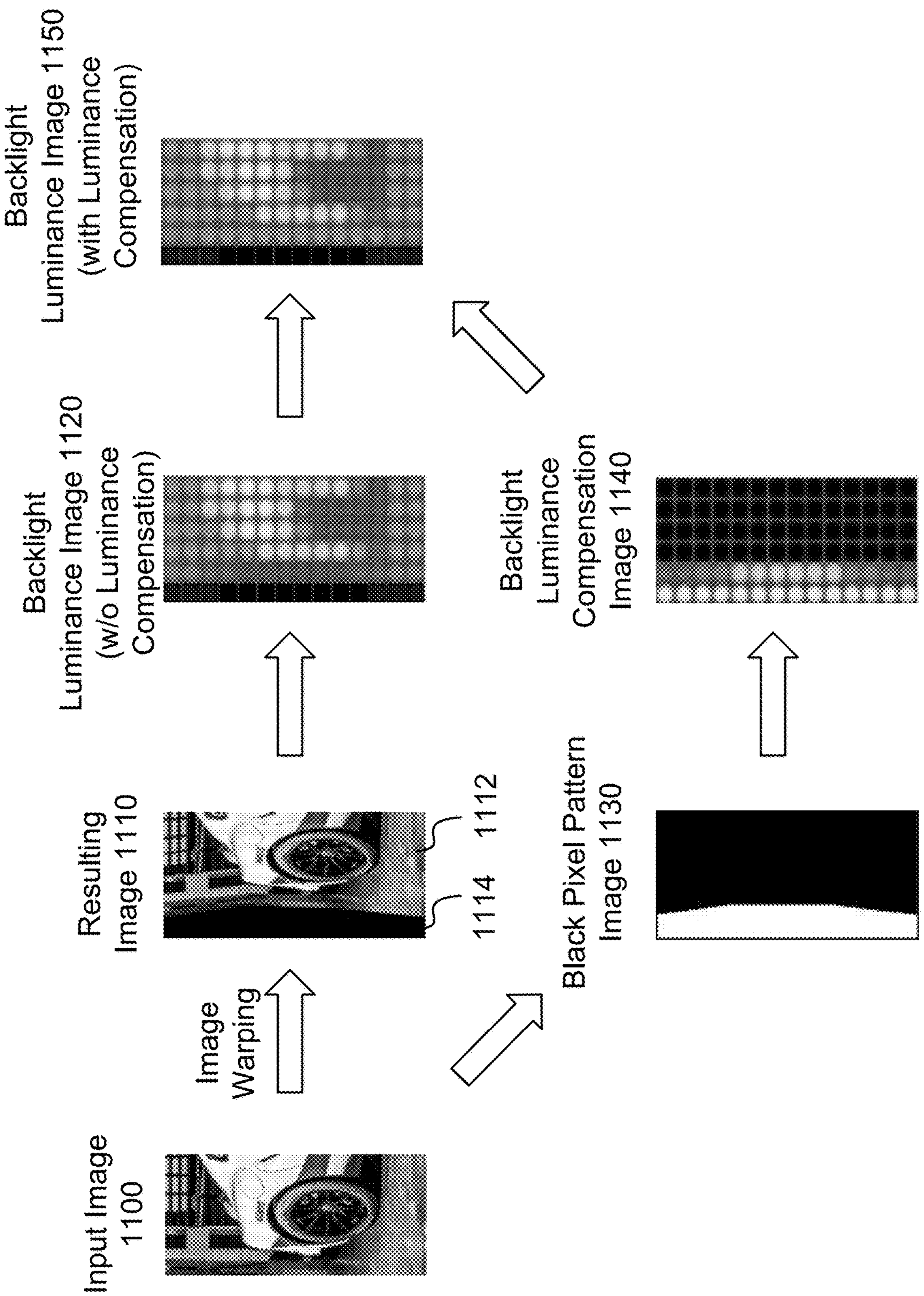
FIG. 11 shows an example of a compensation for a decrease in the luminance level at the edge of a display image, according to one or more embodiments.

FIG. 11 shows an example of compensating for the decrease in the luminance level at the edge of the display image potentially caused by the incorporation of one or more black pixel regions, according to one or more embodiments. Image warping processing is applied to an input image 1100 to produce a resulting image 1110 that includes a warped image 1112 and a black pixel region 1114. If the luminance levels of the light sources 325 of the backlight device 320 are determined based on the resulting image 1110 without luminance compensation, the light sources 325 corresponding to the zones of the resulting image 1110 which at least partially overlap the black pixel region 1114 will be controlled to relatively low luminance levels, which may cause an undesirable decrease in the luminance level at the edge of the display image. In FIG. 11, the backlight luminance image 1120 shows an example distribution of the luminance levels of the light sources 325 without luminance compensation.

In one or more embodiments, compensation for the decrease in the luminance level at the edge of the display image is performed based on black pixel pattern data (e.g., the black pixel pattern data 444 shown in FIG. 5), which is indicative of the black pixel pattern in the resulting image. In FIG. 11, the black pixel pattern is shown as the black pixel pattern image 1130, which is a binary image showing the arrangement of the black pixels incorporated by the image warping processing. In one or more embodiments, the black pixel ratio of each zone of the resulting image is calculated based on the black pixel pattern data, and the luminance compensation coefficient for each light source 325 is determined based on the black pixel ratio of the zone corresponding to the that light source 325. The backlight luminance compensation image 1140 in FIG. 11 shows an example distribution of the luminance compensation coefficients for the respective light sources 325. In one or more embodiments, the luminance compensation coefficients thus determined are applied to the base luminance levels for the respective light sources 325 to determine the specified luminance levels for the light sources 325. In FIG. 11, the backlight luminance image 1150 shows an example distribution of the specified luminance levels for the light sources 325 with the luminance compensation. The luminance compensation using the luminance compensation coefficients determined based on the black pixel pattern data effectively mitigates or eliminates the decrease in the luminance level at the edge of the display image.

Figure 12:
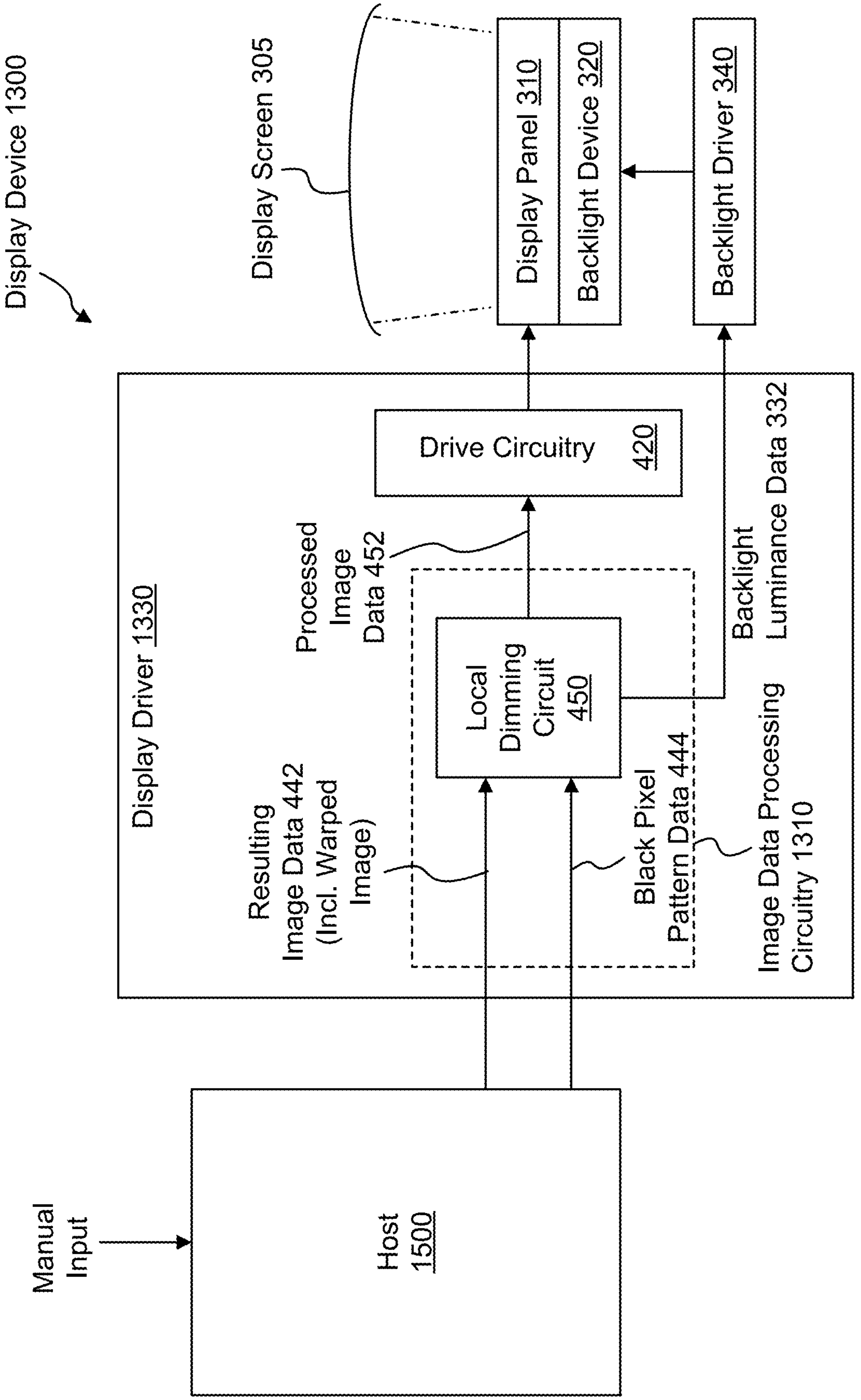
FIG. 12 shows an example configuration of a projector system, according to other embodiments.

FIG. 12 shows an example configuration of a display device 1300, according to other embodiments. In the shown embodiment, a host 1500 is configured to perform image warping processing on input image data to provide resulting image data 442 and black pixel pattern data 444 to a display driver 1330. The display driver 1330 is configured as a DDIC, and the host 1500 is external to the DDIC. The resulting image data 442 represents the resulting image that includes a warped image (a warped version of the input image) and one or more black pixel regions, and the black pixel pattern data 444 represents the black pixel pattern in the resulting image. The host 1500 may be configured to receive a manual input and to adjust the image warping processing (e.g., how the input image is warped) in response to the manual input.

The display driver 1330 is configured to drive the display panel 310 based on the resulting image data 442, and is also configured to control the luminance levels of the respective light sources 325 of the backlight device 320 by providing backlight luminance data 332 to the backlight driver 340 based on the resulting image data 442 and the black pixel pattern data 444. In the embodiment shown in FIG. 12, the image data processing circuitry, denoted by numeral 1310, includes a local dimming circuit 450 configured to produce and provide the backlight luminance data 332 to the backlight driver 340 based on the resulting image data 442 and the black pixel pattern data 444 to control the luminance levels of one or more of the light sources 325 of the backlight device 320. As discussed above, the local dimming function is achieved by individually controlling the luminance levels of the respective light sources 325 of the backlight device 320 based on the resulting image data 442, and the black pixel pattern data 444 is used to compensate for the decrease in the luminance at the edge of the display image on the display screen 305 which may be caused by the incorporation of the black pixel regions into the resulting image. The local dimming circuit 450 is further configured to apply image processing to the resulting image data 442 to produce processed image data 452, and the drive circuitry 420 is configured to drive the display panel 310 based on the processed image data 452. The display panel 310 is illuminated by the backlight device 320 to project a display image onto the display screen 305.

Figure 13:
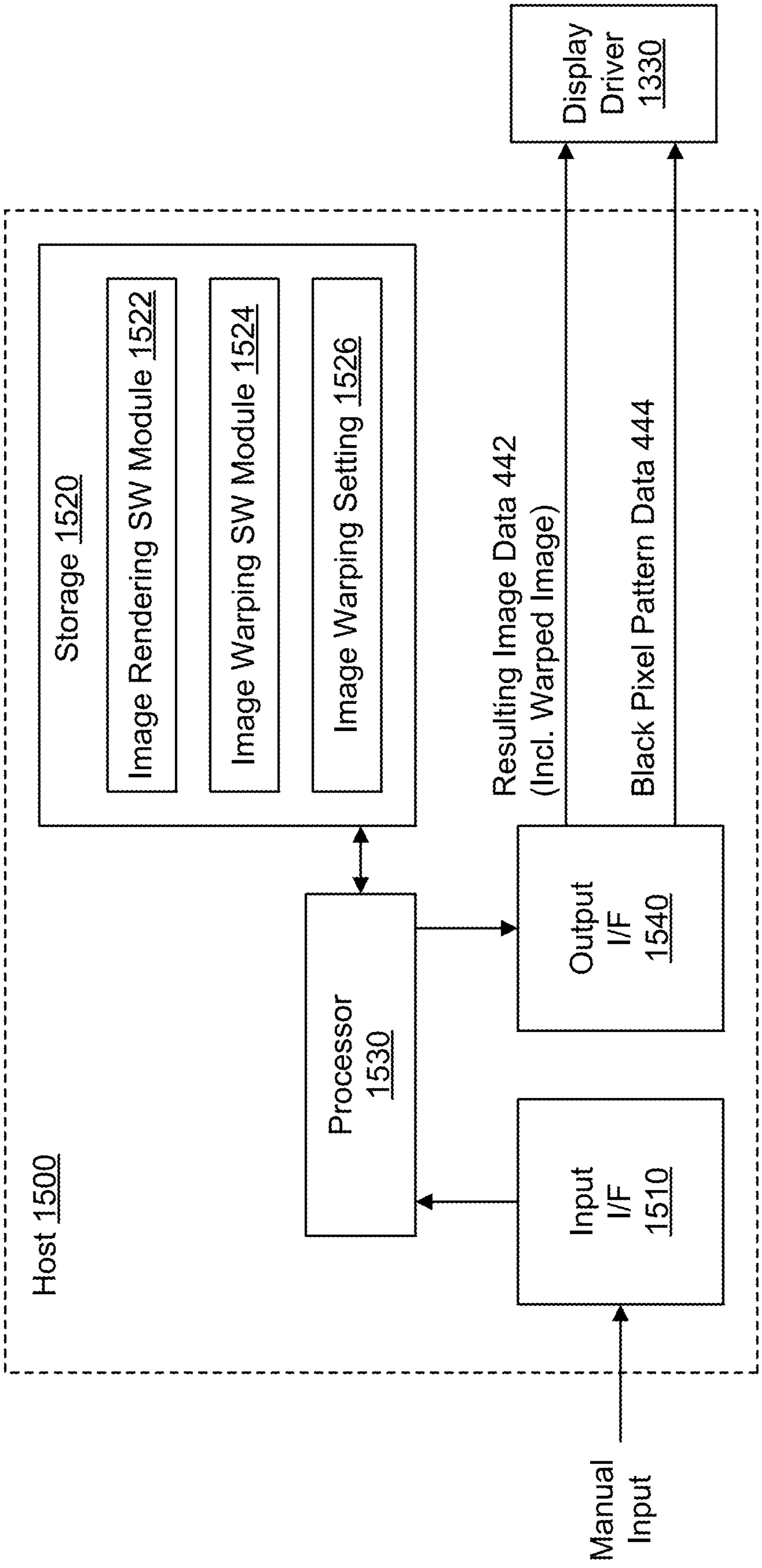
FIG. 13 shows an example configuration of a host, according to one or more embodiments.

FIG. 13 shows an example configuration of the host 1500, according to one or more embodiments. In the shown embodiment, the host 1500 is configured as a computer that includes an input interface (I/F) 1510, a storage 1520, a processor 1530, and an output I/F 1540. The input interface 1510 is configured to receive a manual input from an input device, such as a console, a touch panel, a button, or other types of input devices. The storage 1520 is configured to store data and software used to operate the host 1500. In the shown embodiment, the storage 1520 is configured to store an image rendering software (SW) module 1522, an image warping SW module 1524, and an image warping setting 1526. The image rendering SW module 1522 is a software program that includes program codes for image rendering, and the image warping SW module 1524 is a software program that includes program codes for image warping. The processor 1530 is configured to execute the image rendering SW module 1522 to render an image to be displayed on the display screen 305 and to produce input image data that represents the rendered image. The processor 1530 is further configured to execute the image warping SW module 1524 to perform image warping processing on the input image data to produce the resulting image data 442 that represents the resulting image, which includes the warped image (or the warped version of the rendered image) and one or more black pixel regions. The image warping processing is performed in accordance with the image warping setting 1526. The execution of the image warping SW module 1524 also produces black pixel pattern data 444 that indicates the black pixel pattern in the resulting image. The output I/F 1540 is configured to send the resulting image data 442 and the black pixel pattern data 444 to the display driver 1330.

In one or more embodiments, the host 1500 may be configured such that the image warping is adjustable by the manual input by the user. In such embodiments, the host 1500 may be configured to update the image warping setting 1526 stored in the storage 1520 in response to the manual input. This allows the user to adjust the image warping processing to optimize the display image displayed on the curved display screen 305.

Figure 14:
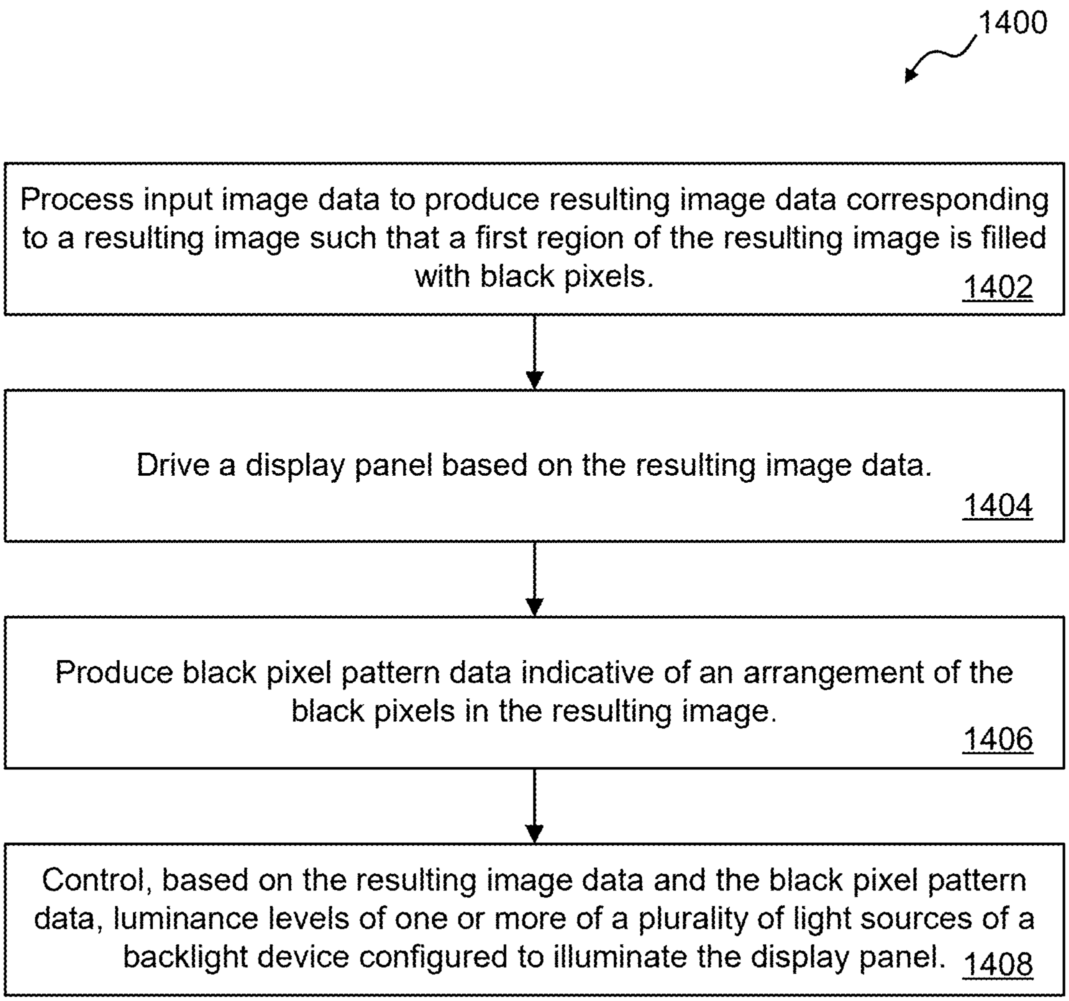
FIG. 14 is a flowchart of an exemplary process for operating a display device, according to one or more embodiments.

FIG. 14 is a flowchart showing an example process 1400 for operating a display device that uses a backlight device including a plurality of light sources to illuminate a display panel, according to one or more embodiments. The process 1400 may be performed by the display system 100 shown in FIG. 1, the display device 300 shown in FIG. 5, or the system shown in FIG. 12; however, it will be recognized that a display device that includes additional and/or fewer components as shown in FIGS. 1, 5, and 12 may be used to perform the process 1400, that any of the following steps may be performed in any suitable order, and that the process 1400 may be performed in any suitable environment.

The process 1400 includes processing input image data to produce resulting image data corresponding to a resulting image such that a first region of the resulting image (e.g., the black pixel regions 144 shown in FIG. 2 and the black pixel regions 540 shown in FIG. 7A) is filled with black pixels (1402). Processing the input image data may include image warping to produce a warped version of the input image. The process 1400 further includes driving a display panel (e.g., the display panel 210 shown in FIG. 1 and the display panel 310 shown in FIGS. 5 and 12) based on the resulting image data (1404). The process 1400 further includes producing black pixel pattern data indicative of an arrangement of the black pixels in the resulting image (1406). The process 1400 further includes controlling, based on the resulting image data and the black pixel pattern data, the luminance levels of one or more of a plurality of light sources (e.g., the light sources 225 shown in FIG. 3 and the light sources 325 shown in FIGS. 6A and 6B) of a backlight device (e.g., the backlight device 220 shown in FIG. 1 and the backlight device 320 shown in FIGS. 5, 6A, 6B, and 12) configured to illuminate the display panel (1408).

In one or more embodiments, the process 1400 may be performed by a display device that is configured as a projector system configured to project a display image onto a curved display screen (e.g., the display screen 110 shown in FIG. 1 and the display screen 305 shown in FIGS. 5 and 12) by causing the light emitted from the backlight device to partially pass through the display panel. In such embodiments, processing the input image data may include performing image warping on the input image data to produce a warped version of the input image and incorporating the warped version of the input image (e.g., the warped images 142 and 520 shown in FIGS. 2 and 7A, respectively) in a second region of the resulting image. The image warping may be based on at least one of the shape of the curved display screen and a manual input, and the shape of the first region of the resulting image may be based on the at least one of the shape of the curved display screen and the manual input. The curved display screen may be formed on the surface of a windshield of an automotive vehicle.

The above-described disclosure is exemplary in nature and is not intended to limit the disclosure or the applications and uses of the disclosure. For example, while the above-described embodiments are based on display systems configured to implement image warping, those skilled in the art would appreciate that the technologies disclosed herein may be applied to display systems which are configured to perform a local dimming function while performing image processing that incorporates one or more black pixel regions into the resulting image.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, comprising:

processing input image data to produce resulting image data corresponding to a resulting image such that a first region of the resulting image is filled with black pixels, wherein the resulting image is segmented into a plurality of zones that corresponds to a plurality of light sources of a backlight device configured to illuminate a display panel;

driving the display panel based on the resulting image data;

producing black pixel pattern data indicative of an arrangement of the black pixels in the resulting image;

determining, based on the black pixel pattern data, black pixel ratio data comprising a plurality of ratios for the plurality of zones, wherein the plurality of ratios comprises a ratio of a number of black pixels in a first zone of the plurality of zones to a total number of pixels of the first zone:

determining a compensation coefficient for the first zone based on comparing the ratio associated with the first zone with lookup table (LUT) ratios within a luminance compensation LUT; and controlling, based on the resulting image data and the determined compensation coefficient, a luminance level of a first light source of the plurality of light sources, wherein the first light source is associated with the first zone.

2. The method of claim 1, wherein the display panel and the backlight device form a projector configured to project a display image on a curved display screen based on the resulting image data, and wherein a shape of the first region of the resulting image is based on at least one of a shape of the curved display screen and a manual input.

3. The method of claim 2, wherein the input image data corresponds to an input image, and wherein processing the input image data comprises:

performing image warping on the input image data based on the at least one of the shape of the curved display screen and the manual input to produce a warped version of the input image; and incorporating the warped version of the input image in a second region of the resulting image.

4. The method of claim 2, wherein the curved display screen is formed on a surface of a windshield of an automotive vehicle.

5. The method of claim 1, wherein the black pixel pattern data comprises a plurality of bits respectively corresponding to pixels of the resulting image, and wherein each of the plurality of bits indicates whether a corresponding one of the pixels of the resulting image is one of the black pixels.

6. The method of claim 1, further comprises:

determining a base luminance level of the first light source based on pixel data of the resulting image data, the pixel data corresponding to the pixels of the first zone; and applying the compensation coefficient to the base luminance level to determine the luminance level of the first light source.

7. The method of claim 1, wherein the resulting image and an input image corresponding to the input image data are rectangular.

8. The method of claim 1, further comprising:

providing, by a host, the resulting image data and the black pixel pattern data to a display driver integrated circuit (DDIC), wherein the host is external to the DDIC and configured to process the input image data to produce the resulting image data and produce the black pixel pattern data, wherein the driving of the display panel and the controlling of the luminance level of the first light source are performed by the DDIC.

9. The method of claim 1, further comprising:

obtaining a display brightness value (DBV) indicating a desired brightness level associated with the display panel, and wherein controlling the luminance level of the first light source is further based on the DBV.

10. The method of claim 1, further comprising:

obtaining a plurality of demura compensations indicating luminance unevenness of the plurality of light sources, wherein the plurality of demura compensations comprises a demura compensation for the first light source, and wherein controlling the luminance level of the first light source is further based on the demura compensation for the first light source.

11. A display device, comprising:

a display panel;

a backlight device comprising a plurality of light sources configured to illuminate the display panel; and a display driver configured to:

process input image data to produce resulting image data corresponding to a resulting image such that a first region of the resulting image is filled with black pixels, wherein the resulting image is segmented into a plurality of zones that corresponds to the plurality of light sources;

drive the display panel based on the resulting image data;

produce black pixel pattern data indicative of an arrangement of the black pixels in the resulting image;

determine, based on the black pixel pattern data, black pixel ratio data comprising a plurality of ratios for the plurality of zones, wherein the plurality of ratios comprises a ratio of a number of black pixels in a first zone of the plurality of zones to a total number of pixels of the first zone;

determine a compensation coefficient for the first zone based on comparing the ratio associated with the first zone with lookup table (LUT) ratios within a luminance compensation LUT; and control, based on the resulting image data and the determined compensation coefficient, a luminance level of a first light source of the plurality of light sources, wherein the first light source is associated with the first zone.

12. The display device of claim 11, wherein the display device comprises a projector, wherein the projector comprises the display panel and the backlight device, wherein the projector is configured to project a display image on a curved display screen based on the resulting image data, and wherein a shape of the first region of the resulting image is based on at least one of a shape of the curved display screen and a manual input.

13. The display device of claim 12, wherein the input image data corresponds to an input image, and wherein processing the input image data comprises:

performing image warping on the input image data based on the at least one of the shape of the curved display screen and the manual input to produce a warped version of the input image; and incorporating the warped version of the input image in a second region of the resulting image.

14. The display device of claim 12, wherein the curved display screen is formed on a surface of a windshield of an automotive vehicle.

15. The display device of claim 11, wherein the black pixel pattern data comprises a plurality of bits respectively corresponding to pixels of the resulting image, and wherein each of the plurality of bits indicates whether a corresponding one of the pixels of the resulting image is one of the black pixels.

16. A display driver, comprising:

image data processing circuitry configured to:

process input image data to produce resulting image data corresponding to a resulting image such that a first region of the resulting image is filled with black pixels, wherein the resulting image is segmented into a plurality of zones that corresponds to a plurality of light sources of a backlight device configured to illuminate a display panel;

produce black pixel pattern data indicative of an arrangement of the black pixels in the resulting image;

determine, based on the black pixel pattern data, black pixel ratio data comprising a plurality of ratios for the plurality of zones, wherein the plurality of ratios comprises a ratio of a number of black pixels in a first zone of the plurality of zones to a total number of pixels of the first zone;

determine a compensation coefficient for the first zone based on comparing the ratio associated with the first zone with lookup table (LUT) ratios within a luminance compensation LUT; and control, based on the resulting image data and the determined compensation coefficient, a luminance level of a first light source of the plurality of light sources, wherein the first light source is associated with the first zone; and drive circuitry configured to drive the display panel based on the resulting image data.

17. The display driver of claim 16, wherein the display panel and the backlight device form a projector configured to project a display image on a curved display screen based on the resulting image data, and wherein a shape of the first region of the resulting image is based on at least one of a shape of the curved display screen and a manual input.

18. The display driver of claim 17, wherein the input image data corresponds to an input image, and wherein processing the input image data comprises:

performing image warping on the input image data based on the at least one of the shape of the curved display screen and the manual input to produce a warped version of the input image; and incorporating the warped version of the input image in a second region of the resulting image.

19. The display driver of claim 16, wherein the black pixel pattern data comprises a plurality of bits respectively corresponding to pixels of the resulting image, and wherein each of the plurality of bits indicates whether a corresponding one of the pixels of the resulting image is one of the black pixels.

* * * * *